No. 683,492. Patented Oct. 1, 1901.
R. P. PICTET.
PROCESS OF SEPARATING OXYGEN AND NITROGEN FROM MIXTURES THEREOF.
(Application filed Aug. 5, 1899.)
(No Model.)
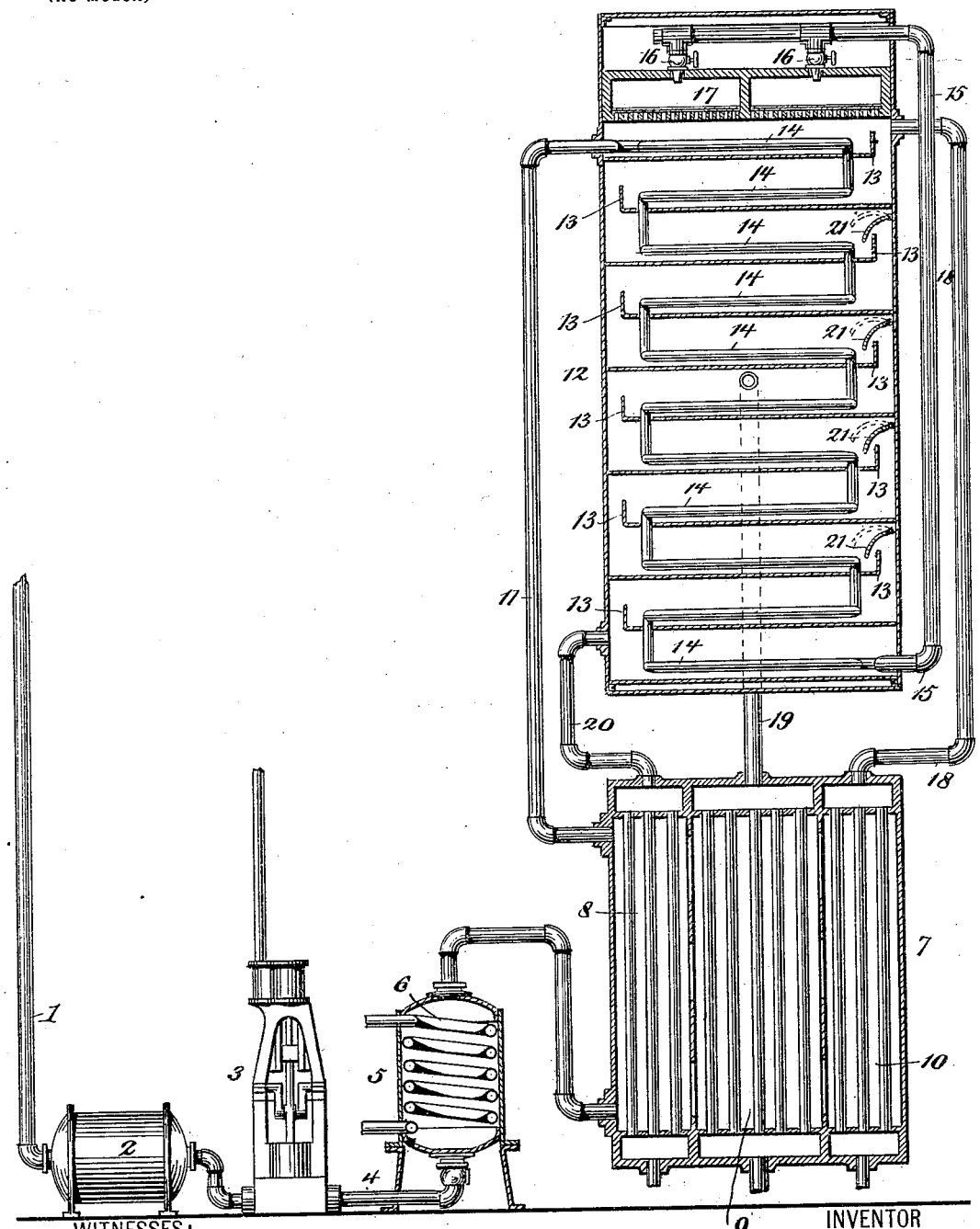

UNITED STATES PATENT OFFICE.

RAOUL PIERRE PICTET, OF NEW YORK, N. Y.

PROCESS OF SEPARATING OXYGEN AND NITROGEN FROM MIXTURES THEREOF.

SPECIFICATION forming part of Letters Patent No. 683,492, dated October 1, 1901.

Application filed August 5, 1899. Serial No. 726,334. (No specimens.)

*To all whom it may concern:*

Be it known that I, RAOUL PIERRE PICTET, a citizen of the Swiss Confederation, residing at 52 West Twenty-fifth street, New York, in the county of New York and State of New York, have invented a new and useful Process of Separating Oxygen and Nitrogen from Mixtures Thereof; and I do hereby declare the following to be a full, clear, and exact description of the invention, such as will enable others skilled in the art to which it appertains to make and use the same.

My invention relates to a process of extracting oxygen and nitrogen from the atmosphere in a practically pure state; and it consists in the novel method of conducting such extraction and separation hereinafter described.

The object of my invention is to extract both oxygen and nitrogen from the atmosphere or from any mixture of the gases in a practically pure state and at a cost so low that the gases so extracted and separated may be utilized on a large scale in various industrial operations and to make the apparatus for carrying out the process as simple, inexpensive, efficient, and as nearly automatic in its operation as possible. This object is attained in the process of extracting and separating oxygen and nitrogen from their mixtures, as from the atmosphere, herein described, the apparatus employed for carrying out the process being illustrated diagrammatically in the drawing which accompanies and forms a part of this specification, in which drawing a dehydrator, exchanger, evaporator, and carbonic-acid filter are shown in section.

My process of separating oxygen and nitrogen from their mixtures is based upon the fact that when a mixture of such gases, as atmospheric air, is liquefied and then allowed to evaporate slowly the nitrogen begins to evaporate before the oxygen, so that if the evaporation takes place under proper but easily-obtainable conditions the two gases may be separated by what is, in fact, a process of fractional distillation, although conducted at temperatures far below those at which distillation is ordinarily conducted. In the process herein described also the heat absorbed by the liquefied gases while evaporating is derived from the entering current of air or other mixture of nitrogen and oxygen to be liquefied, so that comparatively little compression and cooling of the entering current of mixed gases before the outgoing currents of gases are encountered is required.

My process differs from former processes for separating mixed gases by liquefaction and fractional distillation in that prior to liquefying the mixed gases I compress and cool them to an extent sufficient to compensate for all subsequent thermal gains due to absorption of heat from the outside and the like and to compensate for loss due to the necessarily incomplete exchange of heat between the incoming and outgoing currents of gas. I thereby avoid the necessity of releasing and expanding a considerable proportion of the compressed gases in order to liquefy the remainder, which has been the cause of inefficient operation of former systems of separation of mixed gases by liquefaction and fractional distillation.

I will describe my process and the apparatus employed for carrying out the same as applied to the separation of oxygen and nitrogen from atmospheric air.

In the drawing, 1 designates an air-supply pipe, 2 a filter, and 3 a compression-pump. The purpose of the filter 2 is to remove from the entering air dust and other impurities carried by it in such form that they may be removed by filtration. The filter may be constructed in the same manner as the air-filters commonly employed for purifying atmospheric air. The compressor 3 may be of any usual or convenient type capable of compressing air up to a pressure of about one hundred and fifty atmospheres. From the compressor the air passes through a pipe 4 to a dehydrator 5. This dehydrator consists, essentially, of a tank adapted to contain brine or a solution of chlorid of calcium or other liquid which may be cooled to a low temperature without freezing. Preferably the solution within the dehydrator should be maintained at a temperature of about −40° centigrade. This may be effected conveniently by employing cooling-coils 6 within the dehydrator, through which brine cooled to the requisite point by a refrigerating-machine may be circulated, or any other suitable refrigerating agent may be circulated through the cooling-coils in place of brine. The air which enters the dehydrator through the pipe 4 bubbles up through the liquid in the dehydrator. Any moisture carried by the air is frozen by the contact with the intensely-cold brine solution, and the air which passes from the dehydrator is perfectly dry. From the dehydrator the air passes through an exchanger 7. This exchanger consists, essentially, of a casing containing three separate series of cooling-pipes 8, 9, and 10, respectively. The air from the dehydrator passes around but not through these cooling-pipes and then passes through a pipe 11 into an evaporator 12. This evaporator consists, essentially, of a casing within which are a series of shallow evaporating trays or pans 13, placed one above the other in such manner that liquid overflowing from one tray falls into the tray beneath. As hereinafter explained, the liquid which is introduced into the upper of these trays and flows successively from one tray to the other is liquid air or other liquefied mixture of oxygen and nitrogen. In its evaporation, therefore, it is capable of absorbing and must absorb a great quantity of heat. Such heat is abstracted from the air entering the evaporator through the pipe 11, for this pipe is connected to a pipe-coil 14, lying within the uppermost of the evaporating-pans 13, and the coil 14 of the uppermost pan is connected with another similar coil in the pan next below, so that the entering air passes down through the several coils of pipe within the pans of the evaporator. By the time the air has reached the coil 14 in the lowermost tray 13 it is completely liquefied. It then passes upward through a pipe 15 to a point within the casing of the evaporator, but above the evaporating-trays thereof, and is discharged through cocks 16 into a filter 17 and from thence flows into the uppermost evaporating tray 13. The filtering medium employed in the filter 17 may be cloth, cotton, asbestos, or any other material convenient for the purpose. The filter may be constructed as filters employing such filtering mediums are commonly constructed. The purpose of the filter 17 is to abstract from the liquid air carbonic acid and other impurities, which are still gaseous at the temperature of the brine in the dehydrator 5, but are frozen solid when the air is liquefied. When the liquid air enters the evaporating-tray at the top of the evaporator, it commences to evaporate. Because liquid nitrogen is more volatile than liquid oxygen the nitrogen begins to evaporate first, and the temperature of the coils 14 in the evaporating-trays being low and the temperature of the interior of the evaporator being nearly that of the evaporating-point of the fluid the gas liberated in the upper portion of the evaporator is practically pure nitrogen. In the central portion of the evaporator nitrogen and oxygen come off together, and in the lower portion of the evaporator the gas evolved is practically pure oxygen, the nitrogen having been evaporated before the lower portion of the evaporator is reached. To carry off the gases thus liberated in the evaporator, three pipes are employed, numbered 18, 19, and 20, and connected, respectively, to the upper portion of the evaporator, to the middle portion thereof, and to the lower portion thereof. To prevent mingling of the gas in the middle portion of the evaporator, which is a mixture of oxygen and nitrogen, with the pure nitrogen in the upper portion of the evaporator and the pure oxygen in the lower portion of the evaporator, I provide movable gates or valves 21, which extend across the evaporator and may be so placed that they project into the fluid in the trays, thus forming a water seal to prevent the passage of gas without interfering with the flow of fluid from one tray to the next. These gates 21 are mounted upon revoluble shafts projecting through the sides of the evaporator, and by turning said shafts the gates may be raised or lowered, as desired. In the drawing four such gates are shown; but only two should be in action at any one time unless, indeed, a greater number of gas-escape pipes be provided and unless it be desired to divide the evaporator into more than three sections. The pipe 18 connects with the section 10 of the exchanger, the pipe 19 with the section 9, and the pipe 20 with the section 8. The division of the exchanger into these sections is necessary in order to avoid mingling the gases after their separation; but since the entering air passes through all three sections of the exchanger all of the cooling power of the outgoing gases which it is possible to utilize is utilized. The cooling-surface in the several sections of the exchanger should be proportioned according to the relative amounts of gas passing through such sections of the exchanger, so that each section may be equally efficient. The gas issuing from section 8 of the exchanger is practically pure oxygen and may be conducted to a suitable receiver. The gas issuing from section 10 of the exchanger is practically pure nitrogen and may be conducted to a suitable receiver also, and the gas issuing from the section 9 of the exchanger, being a mixture of the two gases, may be discharged into the air-supply pipe 1, if desired, and passed through the apparatus again.

It will be noted that in this process there is a practically complete exchange of heat between the entering current of air and the outgoing currents of gases. The only work which it is necessary to do in order to keep the apparatus in operation, therefore, is the work required to compensate for the heat absorbed from the surrounding atmosphere and similar slight thermal gains, and such gains are compensated for completely by the work done in the compression of the entering air in the compressor 3 and by the heat abstracted from the air in passing through the dehydrator 5.

At the commencement of the operation of the apparatus it may be necessary to compress the entering air to a pressure as high as one hundred and fifty atmospheres; but as the apparatus becomes thoroughly chilled the initial pressure of the air may be reduced very greatly. Because of the complete exchange of heat in my process the process may be carried out very cheaply, so that the oxygen thereby produced may be made available for use on a large scale in various industrial processes and operations. The nitrogen may be utilized also in the production of ammonia and in various other ways.

The manner of carrying on the process is as follows: The evaporating-trays of the evaporator are first filled with liquid air derived from some external source. Such liquid air may be introduced through a suitable cock, (not shown in the drawings,) as will be readily understood. The brine solution in the dehydrator 5 is then cooled to the requisite temperature and the operation of the compressor 3 is commenced. Air is then drawn in by the compressor, filtered and compressed, and is then passed through the dehydrator, wherein the water carried by it is removed and its temperature is lowered the requisite amount. The air then enters the exchanger, wherein it is cooled still further by contact with the pipes through which the gas liberated in the evaporator is passing and, passing through the pipe 11 into the upper coil 14 in the evaporator, is cooled by the liquid air surrounding said coil. The air in its passage through the coils 14 from the upper coil to the lowest coil is liquefied. It then passes through the pipe 15 into the filter 17, wherein the carbonic acid carried by it is removed, and finally it passes into the trays 13 within the exchanger, taking the place of the liquid air within said trays with which the operation was started and which in the meantime has been evaporating. The gas which evaporates in the upper portion of the evaporator is practically pure nitrogen. In the central portion of the evaporator the oxygen begins to evaporate, and by the time the liquid has reached the lower trays of the evaporator practically all of the nitrogen has evaporated, the residue being practically pure oxygen.

The purity of the nitrogen and oxygen drawn off from the apparatus may be varied by lowering or raising different gates 21. If only the lower and the upper gates are down, the others being raised, the purity of the oxygen and nitrogen will be the maximum obtainable. If the second gate from the top be down, the first being raised, the nitrogen delivered may contain some oxygen, which for some purposes may be preferable, and if the second gate from the bottom be down, the lowermost gate being up, the oxygen delivered may contain some nitrogen. For many industrial purposes it may not be necessary to obtain the oxygen nearly free from nitrogen, and in such case the adjustment of the gates 21 in the lower portion of the evaporator will be regulated accordingly. Any liquid which may collect in the bottom of the evaporator is practically pure oxygen and, if desired, may be drawn off through a cock provided for the purpose.

The evaporator, exchanger, and connections should be well lagged to avoid absorption of heat from the surrounding air so far as possible.

The method above described of separating oxygen and nitrogen is also applicable to the separation of other substances, which are gases at ordinary temperature, but which may be liquefied. It is also applicable to the separation of oxygen and nitrogen from any of their mixtures other than atmospheric air.

Having thus completely described my invention, what I claim, and desire to secure by Letters Patent, is—

1. The herein-described process of separating mixed gases capable of being liquefied, and differing in volatility, which consists in compressing and cooling the mixed gases to an extent sufficient to compensate for thermal gains and incomplete transfer of heat between the incoming and outgoing currents, in then producing an exchange of heat between the outgoing currents of gases and the entire amount of mixed gases so compressed, such exchange taking place in a closed cycle and without releasing any portion of the compressed mixture during or prior to such exchange, whereby the entire quantity of incoming gases is liquefied, and in finally evaporating the liquid and separating the gas which first evaporates from that which evaporates later.

2. The herein-described process of separating oxygen and nitrogen from air, which consists in compressing and cooling the air to an extent sufficient to compensate for thermal gains and incomplete transfer of heat between the incoming and outgoing currents, in then producing an exchange of heat between the outgoing currents of gases and the entire amount of air so compressed, such exchange taking place in a closed cycle and without releasing any portion of the compressed air during or prior to such exchange, whereby the entire quantity of incoming gases is liquefied, and in finally evaporating the liquid and separating the gas which first evaporates from that which evaporates later.

3. The herein-described process of separating mixed gases capable of being liquefied, and differing in volatility, which consists in compressing and cooling the mixed gases to an extent sufficient to compensate for thermal gains and incomplete transfer of heat between the incoming and outgoing currents, in then producing an exchange of heat between the outgoing currents of gases and the entire amount of mixed gases so compressed, such exchange taking place in a closed cycle and without releasing any portion of the compressed mixture during or prior to such exchange, whereby the entire quantity of incoming gases is liquefied, in then filtering out substances which are solidified by the liquefaction of the gases, and in finally evaporating the liquid and separating the gas which first evaporates from that which evaporates later.

In testimony whereof I hereunto affix my signature in the presence of two witnesses.

RAOUL PIERRE PICTET.

Witnesses:
HENRY MATHEY,
L. FELIX.